(12) United States Patent
Cheng et al.

(10) Patent No.: US 10,072,127 B2
(45) Date of Patent: Sep. 11, 2018

(54) POLYETHYLENE FILM HAVING UNIQUE AESTHETIC AND PERFORMANCE PROPERTIES

(71) Applicant: The Procter & Gamble Company, Cincinnati, OH (US)

(72) Inventors: Zhan Cheng, Beijing (CN); Lichao Pan, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 18 days.

(21) Appl. No.: 15/290,354

(22) Filed: Oct. 11, 2016

(65) Prior Publication Data

US 2017/0107339 A1    Apr. 20, 2017

(30) Foreign Application Priority Data

Oct. 16, 2015 (WO) .......................... CN2015/092055

(51) Int. Cl.
| | |
|---|---|
| *C08J 5/18* | (2006.01) |
| *B32B 27/32* | (2006.01) |
| *C08J 3/22* | (2006.01) |
| *B32B 27/08* | (2006.01) |
| *B32B 27/18* | (2006.01) |
| *B32B 27/30* | (2006.01) |

(52) U.S. Cl.
CPC ................. *C08J 5/18* (2013.01); *B32B 27/08* (2013.01); *B32B 27/18* (2013.01); *B32B 27/308* (2013.01); *B32B 27/32* (2013.01); *C08J 3/226* (2013.01); *B32B 2264/102* (2013.01); *B32B 2274/00* (2013.01); *B32B 2307/41* (2013.01); *B32B 2307/516* (2013.01); *B32B 2553/00* (2013.01); *C08J 2323/04* (2013.01); *C08J 2323/06* (2013.01); *C08J 2323/08* (2013.01); *C08J 2423/04* (2013.01); *C08J 2433/12* (2013.01); *C08J 2483/04* (2013.01)

(58) Field of Classification Search
CPC ...... C08J 5/18; C08J 2323/06; C08J 2433/12; C08J 2483/04
See application file for complete search history.

(56) References Cited

U.S. PATENT DOCUMENTS

| | | | | |
|---|---|---|---|---|
| 5,122,906 | A * | 6/1992 | Wheatley | ................. B32B 7/02 |
| | | | | 359/586 |
| 2006/0234017 | A1* | 10/2006 | Tajima | .................... B32B 27/08 |
| | | | | 428/195.1 |
| 2011/0091690 | A1* | 4/2011 | Lin | ........................... B32B 7/06 |
| | | | | 428/162 |

FOREIGN PATENT DOCUMENTS

| | | |
|---|---|---|
| JP | 08142277 A | 6/1996 |
| JP | 2006243421 A | 9/2006 |
| JP | 0899395 A | 4/2016 |

* cited by examiner

*Primary Examiner* — Robert D. Harlan
(74) *Attorney, Agent, or Firm* — David M Weirich

(57) ABSTRACT

Certain films comprising polyethylene and poly(methyl 2-methylpropenoate) have unique aesthetic or performance properties.

20 Claims, 8 Drawing Sheets

POLYETHYLENE FILM HAVING UNIQUE AESTHETIC AND PERFORMANCE PROPERTIES

FIELD OF THE INVENTION

The present application is directed to the polyethylene films, and methods of making the same.

BACKGROUND OF THE INVENTION

Flexible thermoplastic films are used in a variety of applications including the construction of packaging and containers, protective films and coatings, and even wall paper. Typical thermoplastic polymers types include PE, PP, and PET. PE is "polyethylene" (also known as polyethene) which is the most produced polymer in the world. In turn, PE is a thermoplastic polymer that can be found in different grades including HDPE ("high-density polyethylene"), MDPE ("medium-density polyethylene"), LLDPE ("linear low-density polyethylene"), and LDPE ("low-density polyethylene"). PP is "polypropylene." PET is "polyethylene terephthalate." Films can be blown or cast, and subsequently are typically stretched. Films may have one or more layers.

There is generally a need to provide visual aesthetics to PE films so products or packaging are more attractive to consumers or connote higher quality. Of course these films preferably have certain performance criteria and are cost effective. Examples of unique aesthetic effects include pearlescent, metallic-like visual effects, increased opacity, and combinations thereof. Conventional approaches to providing these visual effects to films include the use of metallic or pearlescent agents, or metallic or pearlescent inks. However, these ingredients are generally expensive and thus are cost prohibitive in many applications.

One way to characterize these pearlescent and/or metallic-like visual effects from films is by way of a Flop Index. Briefly, Flop Index is the measurement on the change in reflectance of a color as it is rotated through the range of viewing angles. A flop index of 0 indicates a solid color, while a very high flop metallic or pearlescent color may have a flop index of 15. There is a need to provide PE films that have unique aesthetic effects without, or at least minimizing, the use of expensive pearlescent/metallic agents or pearlescent/metallic inks, while preferably exhibiting desired film performance and being cost effective.

Another example of unique aesthetic effects is opacity. In some applications, film opacity connotes quality. One conventional way of providing opacity to films is the use of opacifiers such as titanium dioxide. However, there are potential drawbacks to using titanium dioxide. The ingredient is generally expensive for many applications. Moreover, it has been reported that higher levels of titanium dioxide in films may reduce sealing performance in subsequent forming or packing processes. Furthermore, high titanium dioxide loading levels tend to have titanium dioxide distribution problem in films, in which the titanium dioxide particles forms gel in film and cause so called "fish eye" defects in film. Yet further, this defect may bring in further defects in printing thereby harming the overall aesthetics of printed film. One way to characterize opacity is by ISO method 6504. There is a need to provide PE films that have improved opacity without, or at least minimizing, the use of opacifiers (such as titanium dioxide), while preferably exhibiting desired film performance properties (and do so cost effectively).

Film performance properties are another potential problem for flexible packages. To this end, flexible packages generally need to maintain their integrity and desired aesthetics throughout the supply chain, even into the consumer's home. This is particularly true in e-commerce as the supply chain is generally more demanding on flexible packages than traditional commerce channels. Good mechanical properties of the film improve flexible packages performance throughout the supply chain; and moreover, it can also allow reduction of material use and/or film thickness. However, in the case of thickness reduction, as opacity relates to thickness, a reduced thickness may pose difficulties in maintaining the desired degree of opacity. Adding more titanium dioxide to increase opacity may introduce the aforementioned problems.

Accordingly, there is a need to provide a PE film that provides unique aesthetic and/or performance properties, while more preferably eliminating, or at least minimizing, the use of expensive and/or performance inhibiting ingredients.

SUMMARY OF THE INVENTION

The present invention meets one or more of these needs based on the surprising discovery that by blending a poly (methyl 2-methylpropenoate) thermoplastic polymer (also known as poly methyl methacrylate or simply "PMMA"), and polyethylene ("PE") in a film formulation, preferably where the PMMA and PE are at certain complex viscosity ratios, more preferably oriented at a relatively low orientating temperature, provides a film exhibiting unique aesthetics and/or performance benefits. In one non-limiting example, these aesthetics may be measured by Flop Index or Opacity.

It is an advantage of these films to provide unique aesthetic effects while minimizing, preferably omitting, the use of pearlescent/metallic agents and/or pearlescent/metallic inks. Preferably these unique aesthetic effects are silk-like visual effects (i.e., mimicking the visual appearance of real silk).

It is an advantage of the films to also provide unique tactile benefits (e.g., softness or smoothness).

It is an advantage of film to be made on large scale operation with modifications within the tolerance of most commercial machines.

It is an advantage of the film to have more opacity than conventional films.

It is an advantage of the film to minimize the use of material and/or thickness while providing relatively high levels of opacity.

It is an advantage of the films to having relatively high levels of opacity while minimizing the amount of opacifiers (such as titanium dioxide).

It is an advantage of the films to have improved sealing performance yet provide relatively high levels of opacity.

It is an advantage of the films to have increased mechanical properties compared to conventional films of the same thickness.

One aspect of the invention provides for a film comprising at least one layer, wherein the least one layer comprises: a) 70% to 99%, by weight of the at least one layer, of at least one polyethylene (PE) polymer of a PE component; b) 1% to 30%, by weight of the at least one layer, of a poly(methyl 2-methylpropenoate) (PMMA) polymer of a PMMA component; c) 0% to 15%, by weight of the at least one layer, of an optional ingredient; and wherein the at least one PMMA polymer and the least one PE polymer having a complex viscosity ratio below 4, and wherein complex viscosity is measured via a rotational rheometer from a temperature of 200° C. to 240° C. at 5° C./min heating speed, 1 Hz frequency and constant 5% strain according to ASTM D4440-15.

Another aspect of the invention provides for a film comprising at least one layer, wherein the at last one layer comprises: a) 70% to 99%, by weight of the at least one layer, of at least one polyethylene ("PE") polymer of a PE component; b) 1% to 30%, by weight of the at least one layer, of at least one poly(methyl 2-methylpropenoate) ("PMMA") polymer of a PMMA component; wherein the at least one PMMA polymer has a melt index from 1 gram (g)/10 minutes (min) to 16 g/10 min measured at 230° C. and 3.8 Kg according to ASTM D1238; wherein the at least one PE polymer has a melt index from 0.1 gram (g)/10 minutes (min) to 40 g/10 min measured at 190° C. and 2.16 Kg according to ASTM D1238; wherein the melt index ratio between the least one PMMA polymer and the least one PE polymer is greater than 0.7; and c) 0% to 15%, by weight of the at least one layer, of an optional ingredient. Preferably the melt index ratio between the least one PMMA polymer and the least one PE polymer is from 0.7 to 70, preferably from 1 to 64, and more preferably from 1 to 16.

Another aspect of the invention provides for a flexible film comprising having at least one layer, wherein the at least one layer comprises: a) 70% to 98%, by weight of the at least one layer, of a polyethylene (PE) component, wherein the PE component comprises at least a linear low-density polyethylene (LLDPE) polymer; b) 1% to 30%, by weight of the at least one layer, of a PMMA component; c) 1% to 10%, by weight of the at least one layer, of a silicone additive, wherein the silicone additive has a viscosity greater than 1,000 cSt per ASTM D-4287; and wherein the film has: a Flop Index (FI) of at least 1 according to ASTM E2539; and a Light Reflectance Index (LRI) of at least 0.4 according to ASTM E2539. Preferably the film is substantially free of pearlescent/metallic agents and pearlescent/metallic inks Another aspect of the invention provides for a method of making an a film of the present invention, comprising the step of uniaxially orientating at an orientating temperature below 110° C., preferably below 100° C., more preferably below 95° C., yet more preferably below 90° C., yet still more preferably below 85° C.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, and in which:

FIGS. 1A-1C are scanning electron microscopy ("SEM") images of a first film in a cross section in machine direction, while

FIGS. 1A and 2A is unconverted cast film before stretching of the first film and second film, respectively.

FIGS. 1B and 2B is film stretched along the machine direction at below 80° C. and at 1700% stretch ratio, of the first film and second film, respectively. FIG. 1B is the preferred film under the preferred processing conditions.

FIGS. 1C and 2C is film stretched along the machine direction at about 110° C. and at 1700% stretch ratio, of the first film and second film, respectively.

DETAILED DESCRIPTION OF THE INVENTION

Figure 1A:
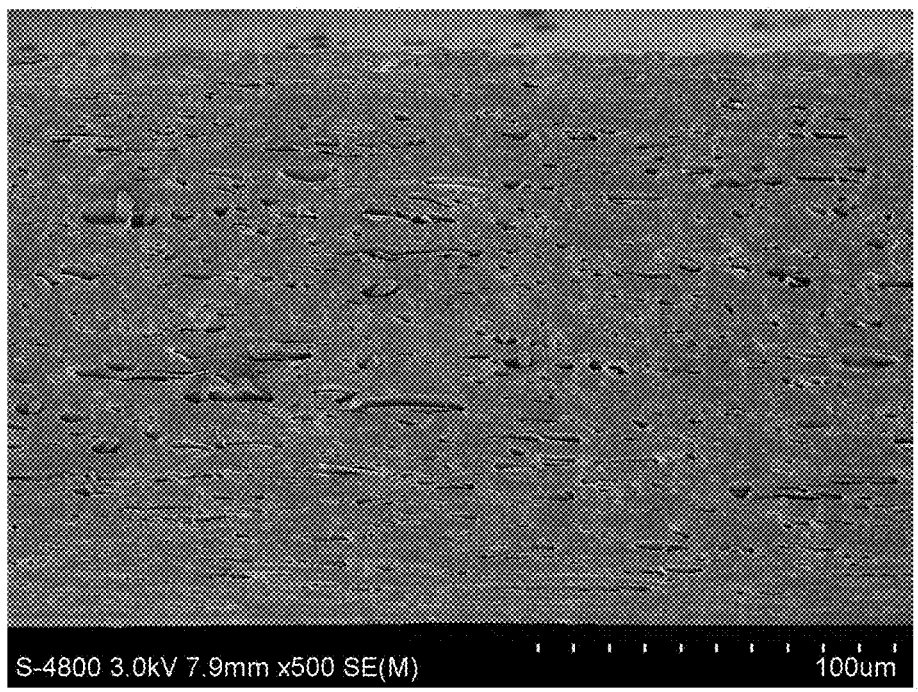

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present invention is generally directed to a PMMA and PE blended film and stretching the film at generally low temperatures to provide films exhibiting unique aesthetic visual effects. Without wishing to be bound by theory, PE and PMMA are immiscible polymers and the blended PE rich film has two separate phases with PMMA particles dispersed in PE matrix. By stretching, phase separation happens around PMMA particles to form cavitation. In turn, this cavitation creates more interfaces which interact with incident light. The difference of refractive index between PMMA and PE further enhances the interaction. As a result, the film shows unique aesthetic visual effects. These unique aesthetic visual effects may be assessed by one or more of the following analytical techniques: Flop Index according to ASTM E2539; Light Reflectance Index (LRI) according to ASTM E2539; and opacity at a defined thickness per ISO 6504.

The term "film" is used broadly to include those films having at least one, or two, or more layers. For example, a two layer co-extrusion film may have a first layer according the invention described herein while the second layer is a conventional one. The films of the present invention may be extrusion or casted, preferably are uniaxially oriented, and more preferably uniaxially oriented in the machine direction. Preferably the film is a flexible film. In multi-layer films of the present invention, other layers of the film may contain PP, PET, EVOH, tie polymers or combinations thereof. Yet other layers of the multi-layer film may contain PE without PMMA.

Polyethylene ("PE")

At least one layer of the films of the present invention comprises polyethylene (PE) as a principle thermoplastic polymer (i.e., a PE-based film). In other words, at least one layer of the film comprises a PE component. In turn, the PE component may comprises one or more divisions (or even sub-divisions) of PE polymers. PE is generally divided into high-density (HDPE, density 0.941 g/cc or greater), medium-density (MDPE, density from 0.926 to 0.940 g/cc), low-density (LDPE, density from 0.910 to 0.925 g/cc), and linear low-density polyethylene (LLDPE, density from 0.910 to 0.925 g/cc). See e.g., ASTM D4976-98: Standard Specification for Polyethylene Plastic Molding and Extrusion Materials. In turn, these PE divisions can be further divided into mono-modal or multi-modal (e.g., bi-modal) sub-divisions.

One of the main uses of polyethylene (HDPE, LLDPE, and LDPE) is in film applications, such as grocery sacks, institutional and consumer can liners, merchandise bags, shipping sacks, food packaging films, multi-wall bag, liners, produce bags, stretch wraps, shrink wraps, and the like. The key physical properties of PE-based film layer may include tear strength, impact strength, tensile strength, stiffness, and transparency. Different combinations of PE divisions, and sub-divisions be used herein depending upon the application and/or desired film property. Preferably, the PE component of the present invention, will comprise some level of a linear low density polyethylene (LLDPE) polymer.

Suitable suppliers/products for PE may include Dowlex™ from Dow Chemical, and Borstar™ from Borealis and Borouge.

At least one layer of the film comprises 70% to 99%, by weight of the at least one layer of the film of a PE component. Preferably the at least one layer of the film comprises from 75% to 98%, more preferably 80% to 95%, yet more preferably 82% to 93%, by weight of the at least one layer, of the PE component. The PE component has at least one PE polymer, optionally two or more PE polymers. At least one layer of the film comprises from 70% to 99%, by weight of the at least one layer, of at least one PE polymer of the PE component. Preferably the at least one layer of film comprises from 75% to 98%, more preferably 80% to 95%, yet more preferably 82% to 93%, by weight of the at least one layer, of the at least one PE polymer of the PE component.

Preferably the at least one film layer comprises from 1% to 100% by weight of the PE component, of a LLDPE polymer. More preferably the LLDPE is from 25% to 100%, alternatively from 25% to 90%, yet more preferably from 30% to 100%, yet more preferably the LLDPE is greater than 50%, preferably greater than at least 60%, more preferably greater than at least 70%, by weight of the PE component (in the at least one film layer).

An important aspect of the invention is the complex viscosity ratio between PMMA and PE. Although details of this ratio are discussed in further detail below, identifying the complex viscosity of the PMMA and PE is necessary. Alternatively, characterizing the melting index ratio between PMMA and PE is another approach.

Figure 3:
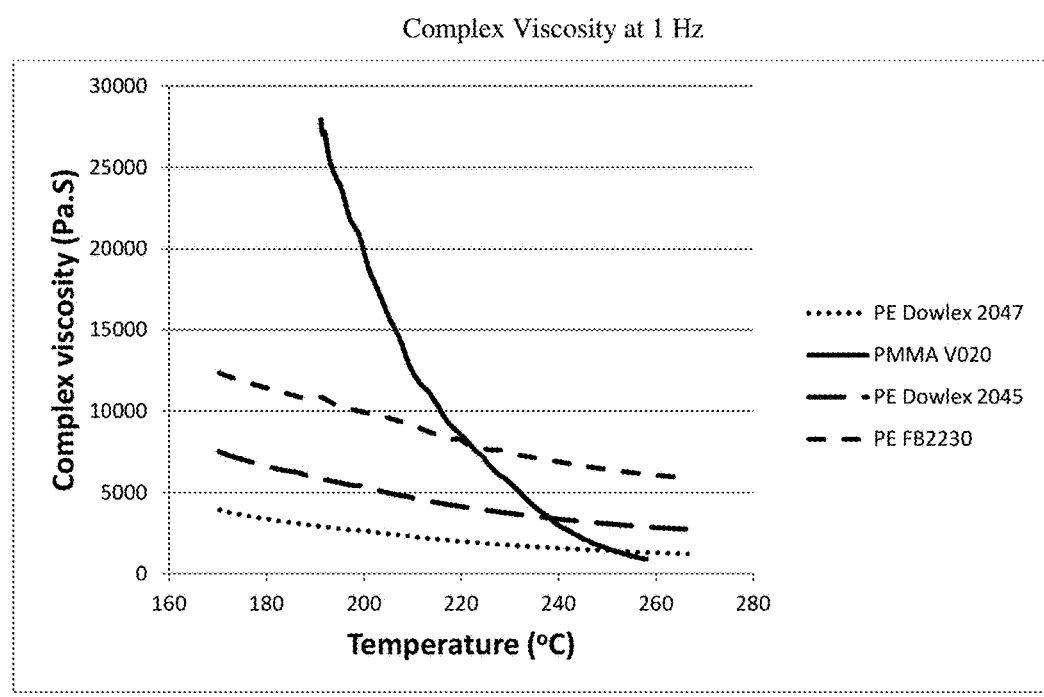
FIG. 3 provides complex viscosity values of several PMMA and PE materials across temperature and at 1 Hz.

Assessing the complex viscosity of at least one PE, or the PE component as whole, is described. Complex viscosity is measured at a temperature range from 200° C. to 240° C., which coincides with the desired processing temperature range. Complex viscosity is also measured via a rotation rheometer at the aforementioned temperature range, at 5° C./min heating speed, at either 1 Hz or 100 Hz frequency, and a constant 5% strain, according to ASTM D4440. Measuring at 100 Hz frequency is preferred because it may better reflect film extrusion conditions. At this temperature range and at 1 Hz frequency, the complex viscosity of at least one PE (of the PE component) has a complex viscosity of $1 \times 10^3$ Pascal-second (Pa*s) to $15 \times 10^3$ Pa*S, preferably from $3 \times 10^3$ Pa*s to $7.5 \times 10^3$ Pa*s, wherein the complex viscosity is measured via a rotational rheometer from a temperature of 200° C. to 240° C. at 5° C./min heating speed, at 1 Hz frequency, and at a constant 5% strain according to ASTM D4440. Alternatively, the PE component (as a whole) has a complex viscosity of $1 \times 10^3$ Pa*s to $10 \times 10^3$ Pa*s, preferably from $2.5 \times 10^3$ Pa*s to $5.5 \times 10^3$ Pa*s, wherein the complex viscosity is measured at these same conditions. FIG. 3 provides the complex viscosity of several PE examples at these same conditions with specific mention to 1 Hz frequency. The PE examples in FIG. 3 include PE Dowlex™ 2047™, PE Dowlex™ 2045™ (from Dow Chemical), and PE Borstar™ FB2230™ (from Borouge).

Figure 4:
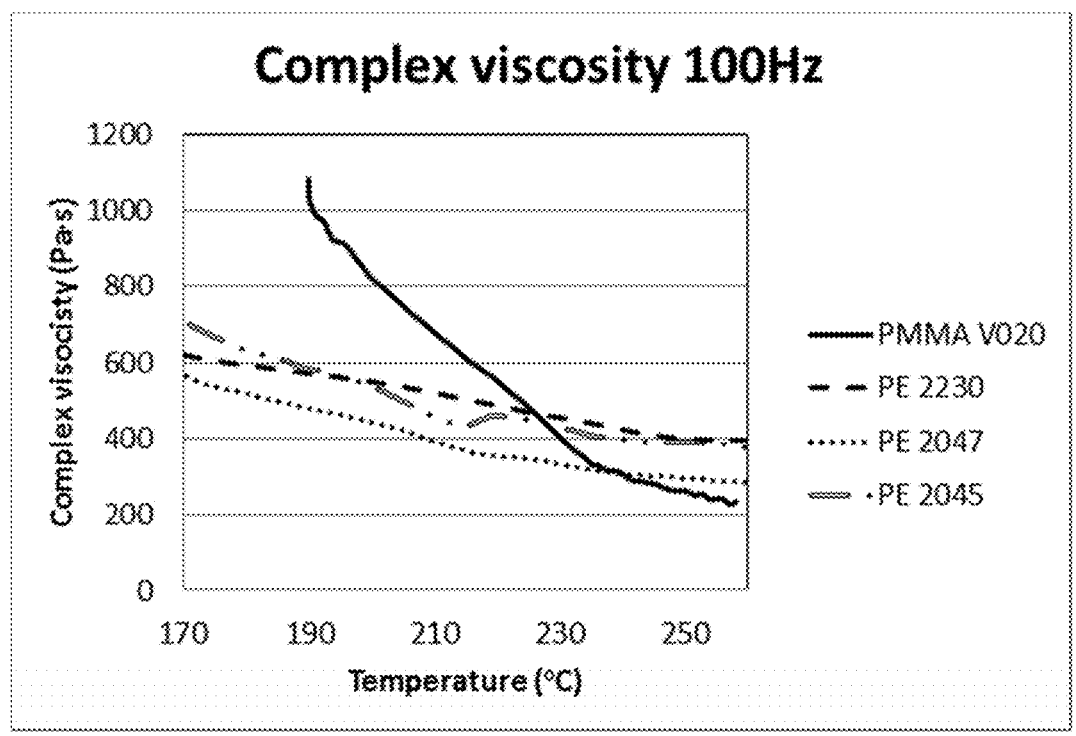
FIG. 4 provides complex viscosity values of several PMMA and PE materials across temperature and at 100 Hz.

The complex viscosity is also measured from the same temperature range of 200° C. to 240° C. but at 100 Hz frequency. At this temperature range and frequency, the complex viscosity of at least one PE, or the PE component as a whole, has a complex viscosity of 250 Pascal-second (Pa*s) to 600 Pa*S, preferably from 380 Pa*s to 600 Pa*s, wherein the complex viscosity is measured via a rotational rheometer from a temperature of 200° C. to 240° C. at 5° C./min heating speed, 100 Hz frequency and constant 5% strain, according to ASTM D4440. Alternatively, the PE component (as a whole) has a complex viscosity of 250 Pa*s to 600 Pa*s, preferably from 380 Pa*s to 600 Pa*s, wherein the complex viscosity is measured at these same conditions. FIG. 4 provides the complex viscosity of PE examples at these same conditions with specific mention to 100 Hz frequency. The PE examples are the same ones tested in earlier FIG. 3.

The melt index of at least one PE, or the PE component as a whole, is described. The melt index of either at least one PE (of the PE component) or PE component, preferably has a melt index from 0.1 gram (g)/10 minutes (min) to 40 g/10 min, preferably from 0.25 g/10 min to 3 g/10 min, even more preferably from 0.25 g/10 min to 2 g/10 min, wherein the melt index is measured at 190° C. and 2.16 Kg according to ASTM D1238.

PMMA

Films of the present invention typically comprise 1% to 30%, by weight of the last one layer of the film, of a PMMA component. In turn, the PMMA component may comprises one or more divisions (or even sub-divisions) of a PMMA polymer. The PMMA component is incorporated with the PE component (within at least one layer of the film) before the extrusion or casting stage of the film making process. Preferably the at least one layer of the film comprises from 1% to 25%, preferably 2% to 25%, more preferably 3% to 15%, yet more preferably 4% to 12%, yet still more preferably 5% to 10%, by weight of the at least one layer, of the PMMA component. The PMMA component has at least one PMMA polymer, optionally two more PMMA polymers. At least one layer of the film comprises from 1% to 30%, by weight of the at least one layer, of a PMMA polymer of the PMMA component. Preferably the at least one layer of the film comprises from 1% to 25%, preferably 2% to 25%, more preferably 3% to 15%, yet more preferably 4% to 12%, yet still more preferably 5% to 10%, by weight of the at least one layer, of the at least one PMMA polymer of the PMMA component.

An important aspect of the invention is the complex viscosity ratio between the least one PMMA polymer (of the PMMA component) and at least one PE polymer (of the PE component). Alternatively, the complex viscosity ratio of the PMMA component and PE component can also be described. Although details of these ratios are discussed in further detail below, identifying the complex viscosity of the PMMA polymer/PMMA component and PE polymer/PE component is necessary.

Assessing the complex viscosity of at least one PMMA polymer, or the PMMA component as whole, is described. Complex viscosity is measured at a temperature range from 200° C. to 240° C., which coincides with the desired processing temperature range. Complex viscosity is also measured via a rotation rheometer at the aforementioned temperature range, at 5° C./min heating speed, at either 1 Hz or 100 Hz frequency, and at a constant 5% strain, according to ASTM D4440. Measuring at 100 Hz frequency is preferred because it may better reflect film extrusion conditions. At this temperature range and at 1 Hz frequency, at least one PMMA polymer (of the PMMA component) has a complex viscosity from $0.15 \times 10^3$ Pascal-second (Pa*s) to $30 \times 10^3$ Pa*s, preferably $1 \times 10^3$ Pa*s to $28 \times 10^3$ Pa*s, measured via a rotational rheometer from a temperature of 200° C. to 240° C., at 5° C./min heating speed, at 1 Hz frequency, and at a constant 5% strain, according to ASTM D4440. Alternatively, the PMMA component (as a whole) has a complex viscosity of $0.15 \times 10^3$ Pa*s to $20 \times 10^3$ Pa*s, preferably from $1 \times 10^3$ Pa*s to $18 \times 10^3$ Pa*s, wherein the complex viscosity is measured at these same conditions. FIG. 3 provides the complex viscosity of the PMMA polymer example of PMMA V020 (Plexiglas® from Arkema) at these same conditions with specific mention to 1 Hz frequency.

The complex viscosity is also measured from the same temperature range of 200° C. to 240° C. but at 100 Hz frequency. At this temperature range and frequency, the complex viscosity of at least one PMMA polymer (of the PMMA complex) is from 150 Pa*s to 800 Pa*s, preferably 250 Pa*s to 550 Pa*s, wherein the complex viscosity is measured via a rotational rheometer from a temperature of 200° C. to 240° C., at 5° C./min heating speed, at 100 Hz frequency, and at a constant 5% strain, according to ASTM D4440. Alternatively, and at this temperature range and at a frequency of 100 Hz, the PMMA component (as a whole) has a complex viscosity of 150 Pa*s to 800 Pa*s, preferably 250 Pa*s to 550 Pa*s, wherein the complex viscosity is measured as at these same conditions. FIG. 4 provides the complex viscosity of PMMA polymer example PMMA V020 (Plexiglas® from Arkema) at these same conditions with specific mention to 100 Hz frequency.

The complex ratio between PMMA and PE is described. Notably at the temperature range of 200° C. to 240° C. and at a frequency (1 Hz), the complex viscosity ratio between at least one PMMA polymer (of the PMMA component) and at least one PE polymer (of the PE component) is below 4, preferably from 0.1 to 4, more preferably from 0.8 to 3.5, yet more preferably below 3, wherein the complex viscosity is measured as previously described. Alternatively, and at this temperature range and frequency, the complex viscosity ratio between the PMMA component (as a whole) and the PE component (as a whole) is below 4, preferably from 0.1 to 4, more preferably from 0.8 to 3.5, yet more preferably below 3, wherein the complex viscosity is measured as previously described.

The complex viscosity ratio between PMMA and PE can also be described at 100 Hz frequency. Notably at the same temperature, but at a frequency of 100 Hz, the complex viscosity ratio between at least one PMMA polymer (of the PMMA component) and at least one PE polymer (of the PE component) is below 1.6, preferably from 0.5 to 1.5, more preferably from 0.7 to 1.5, yet more preferably below 1.2, herein the complex viscosity is measured via a rotational rheometer, from a temperature of 200° C. to 240° C., at 5° C./min heating speed, at 100 Hz frequency, and a constant 5% strain, according to ASTM D4440. Alternatively, and at this temperature range and at a frequency of 100 Hz, the complex viscosity ratio between the PMMA component (as a whole) and the PE component (as a whole) is below 1.6, preferably from 0.5 to 1.5, more preferably from 0.7 to 1.5, yet more preferably below 1.2, wherein the complex viscosity is measured as previously described.

Preferably the Vicat softening point (also known as Vicat hardness) for at least one PMMA polymer (of the PMMA component) is below 115° C., more preferably below 110° C., yet more preferably is below 105° C. under 1 kg and rate A according to ASTM D1525. Alternatively, the Vicat softening point of the PMMA component (as a whole) is below 115° C., more preferably below 110° C., yet more preferably is below 105° C. under 1 kg and rate A according to ASTM D1525. Vicat softening point is the determination of softening point for materials that have no definite melting point. Without wishing to be bound by theory, having a Vicat softening point below these values helps for film processing. There is generally less film rupture during processing (e.g., during orientation).

Preferably the at least one PMMA polymer (of the PMMA component) used in the present invention has a refractive index that equals or is less than 1.49 according to ASTM D-542. Without wishing to be bound by theory, the refractive index difference between PE and PMMA determines the intensiveness of the light interaction in the interface, wherein having a greater difference is preferred.

Different brands and manufactures of PMMA polymers may include: Lucite®L (Lucite International, Inc, USA); Plexiglas® (Altuglas International); and Acrylite® GP (Piedmont Plastics, CYRO Industries, USA). Arkema may also be a suitable supplier of PMMA. The PMMA polymer can also be one that is modified, such as, example, the polyvinylidene fluoride polymers as described in WO 2009108469.

The melt index of at least one PMMA polymer (of the PMMA component), is described. The melt index of least one PMMA polymer preferably has a melt index from 1 gram (g)/10 minutes (min) to 16 g/10 min, preferably 1 g/10 min to 3.5 g/10 min, more preferably from 1.6 g/10 min to 2 g/10 min, wherein the melt index is measured at 230° C. and 3.8 Kg according to ASTM D1238. Alternatively the PMMA component (as a whole) preferably has a melt index from 10 g/10 min to 16 g/10 min, wherein the melt index is measured at 230° C. and 3.8 Kg according to ASTM D1238.

The melt index ratio between the least one PMMA polymer (of the PMMA component) and the least one PE polymer (of the PE component) is greater than 0.7, preferably from 0.7 to 70, more preferably from 1 to 64, and even more preferably from 1 to 16.

The films may contain optional ingredients. The at least one layer of the film comprises from 0% to 15%, preferably from 1% to 12%, more preferably 2% to 10%, by weight of the at least one layer, of an optional ingredient. The optional ingredient preferably comprises at least a silicone additive, alternatively comprises at least a compatibilizer, more preferably comprises a silicone additive and a compatibilizer. In one embodiment, the film is an opaque film, wherein the optional ingredient may further comprise an opacifier, preferably wherein the opacifier is titanium dioxide.

Silicone Additive

A silicone additive is an optional, but preferred additive in the films herein. Without wishing to be bound by theory, silicone additive can act not only as a slip agent, but certain silicone additives or at relatively higher levels can enhance the visual and/or tactile effects of the films herein. The films of the present invention, that contain silicone additive, may comprise from 0.01% to 10% of the silicone additive by weight of the least one layer of the film, preferably from 0.5% to 8%, more preferably from 1% to 5%, yet more preferably from 1.5% to 3% by weight of the at least one layer of the film, of the silicone additive. The silicone additive can be added either via a master batch which to be blended with other ingredients during film extrusion stage; or at a film extrusion stage in which the silicone additive is directly blended with other ingredients; or a combination thereof.

Many silicone types are contemplated within the scope of the invention. The silicone additive is preferably a silicone fluid, more preferably a silicone oil. Preferred silicones include linear or branched silicone fluids and cyclic silicone fluid and combinations thereof. Although not preferred, the following silicones may also be used: gums, resins, gels, rubber, elastomers, solid silicones, and combination thereof. The molecular structure is another way of characterizing the silicone of the present invention. Both cyclic and linear silicones, and combinations thereof, are within the scope of the invention. Organic functionality is another parameter in defining the silicone of the present invention. Within the scope of the present invention these organic functionalities may include alkyl, preferably $C_1$ to $C_5$ alkyl, ethyl, methyl, dimethyl polyether, amino, and combinations thereof.

Kinematic viscosity is one way of characterizing the molecular weight of the silicone. Preferably, the silicone additive may have a kinematic viscosity of at least 500 centistokes (cSt), more preferably at least 750 cSt, yet more preferably at least 1000 cSt. Preferably the viscosity is from 500 cSt to 40,000,000 cSt, more preferably from 1000 cSt to 20,000,0000 cSt.

One example of a silicone additive is a linear dimethicone having a viscosity below 600,000 cSt, preferably from 1,000 cSt to 600,000 cSt.

In another example, the silicone additive is an ultra high molecular weight silicone (e.g., Dow Corning). The silicone additive is high molecular weight having a molecular weight from 400,00 Dalton to 700,000 Daltons, preferably from 500,000 Daltons to 650,000 Daltons. The silicone additive can also provided by way of a master-batch (e.g., in a PE matrix). "MB 50-002" from Dow Corning is a suitable example, having a molecular weight of about 600,000 Daltons; and an overall viscosity of about 40,000,000 cSt.

Methods of measuring kinematic viscosity of silicones are described. On approach is using a glass capillary viscometer per method ASTM D-445, IP 71 with results reported in Stokes (St). Briefly, the kinematic viscosity of liquids is determined by measuring the time required for a fixed volume of samples to pass through a calibrated glass capillary. For those silicones having a viscosity generally greater than 12,500 cSt, viscosity can be assessed by a pressure viscometer at designated shear rates per the procedure of ASTM D 1092. Briefly, the sample is forced through a calibrated capillary. The equilibrium pressure is determined and used to calculate the viscosity. The shear rate is a function of the radius of the capillary and volume flow per unit of time.

Without wishing to be bound by theory, the higher the viscosity of the silicone generally the better since higher viscosity silicone will give better processing feasibility than lower viscosity silicone. However, the viscosity should not be so high such that the silicone is a solid such that it forms less than ideal sized and/or dispersed silicon vesicles.

The silicone additive of the present invention is preferably a silicone oil. Non-limiting examples of suitable silicone oils may include polydialkylsiloxanes, polyalkylphenylsiloxanes, olefin-modified siloxane oils, olefin/-polyether-modified silicone oils, epoxy modified silicone oils, alcohol-modified silicone oils, polydialkylsiloxanes (which preferably has from 1 to 5, more preferably 1 to 4, carbon atoms in the alkyl group, yet more preferably the polydialkylsiloxane is polydimethylsiloxane). One suitable supplier of such silicone may include Dow Corning.

Compatibilizer

A compatibilizer is an optional, but preferred optional ingredient in the least one layer of the film. PE and PMMA blends are generally immiscible due to nonpolar nature of polyethylene and polar nature of PMMA. This immiscibility may lead to phase separation, which is a factor for the poor mechanical properties of many films made from these conventional blends, but also contributes to the visual effects achieved via orientation process per present invention (further described herein). Some of the negative effects of the immiscibility of the PMMA and PE blends of the present invention can be mitigated by adding a proper compatibilizer.

Generally, and without wishing to be bound by theory, the function of a compatibilizer used in the present invention is to reduce interface tension (i.e., strengthen the interface between the phases) and thus improve mechanical properties of the stabilized blend (e.g., reducing the size and morphology of the phase-separated phases). It is thought the compatibilizer strengthens the interface by broadening it from a sharp change in composition and properties to a broader gradual transitional interface.

In present invention, there is a balance to be reached with the use of a compatibilizer in the PMMA and PE blended films. On one hand, adding compatibilizer makes for finer PMMA phase which can help achieve more desirable structures (in providing the visual effects). And the compatibilizer can also strengthen the interface and thus help improve film mechanical film strength. However, on the other hand, compatibilizer makes phase separation more difficult to happen during stretching, which may not lead to the formation of the desired microstructure. Of course some films of the present invention are free or substantially free of these compatibilizers.

An example of a suitable compatibilizer material include maleic anhydride grafted LLDPE (LLDPE-g-MA). One suitable supplier of such LLDPE-g-MA includes Mitsui Chemical. Other suitable compatibilizer materials include but not limited to Ethylene Vinyl Acetate, Ethylene Acrylic Acid, Ethylene Butyl Acrylate, and PMMA grafted PE (PE-g-PMMA), etc.

At least one layer of the film typically comprise 0.1% to 7%, preferably 0.5% to 5%, more preferably 1% to 3%, alternatively 1.5% to 2% by weight of the least one layer, of the compatibilizer.

Opacifier

It is an advantage of some of the inventive films herein to have more opacity than comparable conventional films while minimizing the amount of opacifier (such as titanium dioxide). Generally, opacity is a measure of the capacity of a material to obscure the background behind it. Opacity measurements are sensitive to material thickness and degree of pigmentation or level of opacifier (e.g. titanium dioxide ($TiO_2$) particles). The opacity value is shown as a percentage between 1 and 100%. The value for opacity is obtained by dividing the reflectance obtained with a black backing (RB) for the material, by the reflectance obtained for the same material with a white background (WB). This is called the contrast ratio (CR) method % Opacity=RB/RW×100. Suitable methods to measure opacity include ISO 6504.

Other opacifiers may include $CaCO_3$, Carbon black, $ZnO_2$, $BaSO_4$, and organic dye. In some applications, titanium dioxide is preferred where the films are desired to have a white appearance. One skilled in the art will readily identify other opacifiers by selecting those materials that have a refractive index substantially different than the rest of the film layer. Many of films described herein provide greater opacity (potentially as well as other desired aesthetic visual effects) that cannot otherwise be provided by many conventional films (of comparable or lower thickness etc.). In those applications, where increased opacity is desirable, the present films may provide enough opacity without expensive opacifiers or at least minimizing the use of such opacifiers (such as titanium dioxide ($TiO_2$)). Even those films where significant opacity is needed, a lesser amount of opacifier may be used. Typically, the present invention may comprise from 0% to 10%, preferably from 1% to 5% by weight of at least the one layer of the film, of the opacifier is included. For example, the film may have a thickness of 45 micrometers and contain less than 5% of titanium dioxide by weight of the film layer, and yet still achieve opacity greater than 78% per ISO method 6504.

In some applications, the film of the present invention may have opacity of greater than 60%, preferably greater than 70%, more preferably greater than 75%, at a film thickness at or below 50 microns per ISO 6504. Preferably the film contains from 0% to less than 5%, preferably less than 4%, more preferably less than 3%, by weight of the at least one layer of the film, of an opacifier, preferably wherein the opacifier is titanium dioxide.

Master Batch

A master batch comprising: PE and PMMA; and optionally silicone additive and/or compatibilizer, is prepared. Typically the master batch comprises from 50% to 95%, preferably 60% to 90% of a PE component, alternatively about 60%, by weight of the master batch, of a PE component. The master batch typically comprises from 5% to 20%, preferably from 10% to 20% of, alternatively from 12% to 18%, alternatively about 15%, by weight of the master batch, of a silicone additive. Of course the master batch may comprise additional optional ingredients, preferably from 0% to 10% by weight of the master batch. Non-limiting examples of additional optional ingredients that may be included in the master batch may include slip agents and anti-block agents and ultraviolet light protective agents.

The master batch may be prepared by heat extruding a first batch of PE pellets with a first heat extruder, either single or double screw, wherein the PMMA and optional silicone additive/compatibilizer are added at one more ports along the extruder. Typical operating temperatures for the first heat extruder are from 180° to 250° Celsius (C), preferably 190° to 230° C. Preferably the maximum heat of the first heat extruder is at the lower range than that recommended as the processing temperature for PMMA pellets, as PMMA typically has a higher process temperature than polyethylene pellets. For purposes of clarification, the term "pellets" means smaller sized nuggets, pastilles, or the like to allow for efficient melting and/or extrusion and/or blending.

Extrusion

The master batch may be combined with a second batch of PE pellets in a desired weight ratio. The second batch of PE pellets may or may not be the same composition as the first batch of PE pellets (as detailed above in master batch preparation). A typical weight ratio range between the master batch and the second batch of PE pellets is from 1:1 to 1:9 weight ratio, preferably from 1:2 to 1:4 weight ratio, more preferably from 1:2 to 1:3 weight ratio, respectively. The combination of master batch and second batch of PE pellets may be subjected to a blending step to provide a blend.

The resulting blend is extruded through a second heated extruder, either single or double screw, preferably through an extruder having a temperature gradient to form an extrudate. Initial temperatures of the second heated extruder, for example, may be at 200° C. incrementally increased downstream to a final temperature of 250° C. Of course these temperatures may vary depending upon the composition of the resulting blend, and length/speed of the second heated extruder etc. An optional step is adding yet more PMMA and/or silicone additive and/or compatibilizer through one or more ports of the second heated extruder to yet further increase the overall PMMA/silicone additive/compatibilizer concentration. Alternatively, no master batch is prepared, but rather PMMA or silicone additive or compatibilizer is simply added via the second heated extruder with only a single batch of PE pellets extruded there through.

The extrudate is formed after being extruded through the second heated extruder. The extrudate is then subjected to a blowing step or a casting step. The typical blowing step is to extrude the extrudate upward via a ring die to form a tube, and inflate the tube while pulling it through a collapsing frame whereby the tube is enclosed with a frame and nip rollers. The blowing step can also be a water quenching process, in which the inflated tube is extruded downward through a ring die with another water ring to spray water on the tube surface to quench it. A casting step subjects the extrudate though a T-die to form a flat sheet with an air knife to push the flat sheet against a cooling roller to set the film. These steps are generally conventional. The blown and/or casted extrudate is formed into an unconverted film. The unconverted film typically has hazy appearance and it requires additional orientation process to impart the desired unique aesthetic effects.

Machine Direction Orientation

The unconverted film is thereafter at least uniaxially oriented, preferably machine direction ("MD") oriented. The MD direction is also known as the longitudinal direction (generally perpendicular to the traverse direction (TD)). MD orientating is a preferred initial step after the unconverted film is formed. During the MD orientation, the unconverted film from the blown or casted line is heated to an orientation temperature via one or multiple hot rollers. The heated film is fed into a slow draw roll with a nip roller, which has the same rolling speed as the heating rollers. The film then enters a fast draw roll. The fast draw roll has a speed that is 2 to 10 times faster than the slow draw roll, which effectively stretches the film on a continuous basis. There can be another fast draw roll which is even faster than the first fast draw roll so that the film is subjected to two step stretching. Between the two stretching steps there is another set of heating rolls which sets the temperature of the film after the first stretching and before the second stretching. The temperatures in these two stretching steps can be the same or different. The orientation can also be a single stretching instead of two step stretching.

The total MD stretch ratio is from 2:1 to 10:1, more preferably from 3:1 to 9:1, and even more preferably from 5:1 to 8:1. The total MD stretch ratio includes all orientation steps. For example, if a two-step orientation is used with first stretch ratio 2:1 and second stretch ratio 3:1, the total stretch ratio is therefore 6:1.

An important aspect of the process of making the film of the present invention is the orientation temperature. At typical conventional temperature range, the PE amorphous phase polymer is well melted so that it has good mobility to accommodate the deformation during the stretching, while the crystallinity phase is still maintained and can be oriented during the stretching to impart desired film property. However, in present invention, we surprisingly found that lower orientation temperature is an important factor in providing the unique aesthetic effects herein. The orientation temperature of the present invention, preferably in a MD orientation, is around 50° C. to below 110° C., preferably below 100° C., more preferably below 95° C., alternatively below 95° C., or 60° C. to 90° C., or below 85° C., or from 70° C. to 80° C. The temperature also depends on the process speed. In general, higher process speed requires relatively higher temperature due to the relative shorter contacting time between film and hot rollers; while slower process speed requires relatively lower temperature due to the longer contacting time. During orientation, and without wishing to be bound by theory, the stretching results in phase separation in the interface between PMMA dispersed particles and the PE matrix, thereby forming micro cavities around PMMA particles. These cavities are typically stretched along the MD orientation direction and have a propagating effect along the machine direction and across the thickness of the film to create yet more larger quantity/more separation of the PMMA/PE interface. At a high orientation temperature, the mobility of the PE amorphous phase is rather high and thus is able to fill these cavities preventing or eliminating the formation of some of these desired micro structures. In contrast, a low orientation temperature (per the present invention) maintains the micro structure quite well. Thus, the lower orientation temperature results in films that have desired unique aesthetic effects. But too low an orientation temperature makes the film more difficult to be stretched due to higher stretching force, and the film tends to break or rupture as the poor mobility of PE amorphous phase can't accommodate the deformation during orientation. Therefore the orientation temperature of the present invention is helpful in finding the appropriate balance between both of these aspects.

Optionally, the stretched film then enters annealing thermal rollers, which allow stress relaxation by holding the film at an elevated temperature for a period of time. Annealing generally makes the film less stiff and softer to the touch, which are desired tactile effects for a film in some applications. To achieve such annealing, the annealing temperature should not be below the orientation temperature, and more preferably the annealing temperature is 5-10° C. above the orientation temperature. But in either case, the annealing temperature is generally not expected to exceed 110-120° C., because as at such temperatures, the unique aesthetic effects of the film can be harmed. As a last step, the film is cooled through cooling rollers to an ambient temperature. The resulting MD oriented film may be further subjected to either: optional surface treatment steps/optional coatings (described below); or proceed to further TD orientation. In contrast, a shrink film will preferably not have annealing or be at annealing temperature much lower than orientation temperatures.

A typical thickness of the MD oriented film, i.e., overall film, is from 15 microns to 80 microns, preferably from 20 microns to 70 microns, more preferably from 40 microns to 60 microns, alternatively from 20 microns to 50 microns, alternatively combinations thereof. Within these MD oriented films, at least one (or more) of the inventive layers may have a thickness of 20 to 60 microns.

Traverse Direction (TD) Orientation

The resulting MD oriented film, alternatively unconverted film, is subject to TD orientation. TD orientation is not desired in present invention as a step subsequent to MD orientation. In such a case, subsequent TD orientation typically harms the unique aesthetic effects that otherwise may be available from the film. However, TD orientation alone can be a viable alternative approach to MD orientation alone. That is, the TD orientation alone can create the desired micro structure along the transverse direction so that it imparts similar unique aesthetic effects as observed from MD orientation.

One way of conducting TD orientation is using a tenter frame, preferably also using a plurality of tenter clips that orient the film in a non-machine direction, more preferably wherein the non-machine direction is perpendicular to the machine direction. Briefly, the tenter clips clip peripheral edge of the film and pull the film toward the frame of the tenter frame (i.e., the non-machine direction). The temperature range for the whole TD orientating process should be about the same as what desired for MD orientation. Other than this temperature modification, all other TD orienting variables are similar to conventional TD orientating processes.

The TD film, compared to before entering the TD orienting step (i.e., the unconverted film or MD oriented film), is stretched, such that the total TD stretch ratio is from 2:1 to 10:1, more preferably from 3:1 to 9:1 and even more preferably from 5:1 to 8:1. The total TD stretch ratio includes all orientation steps.

A typical thickness of the TD oriented films is from 15 microns to 80 microns, preferably from 20 microns to 70 microns, more preferably from 40 microns to 60 microns, alternatively from 20 microns to 50 microns, alternatively combinations thereof. Within these TD oriented films, one or more of the inventive layer have a thickness of 20 to 60 microns.

Commercial available converting systems may include those from DUSENBERY, MARSHALL and WILLIAMS, winders may come from and PARKSINSON. Drive and control systems for film making may include those from ALLEN-BRADLEY Powerflex AC drives, and ALLEN-BRADLEY ControlLogix PLC processor. A suitable manufacture may be PARKINSON TECHNOLOGIES, Inc. (Woonsocket, R.I., USA).

The overall thickness of the at least uniaxially, or biaxially stretched, film of the present invention can vary within broad limits and depends on the intended use. In one example, the overall film thickness is preferably from 15 microns to 80 microns, preferably from 20 microns to 70 microns; in particular from 20 microns to 30 microns, preferably from 30 microns to 60 microns. At least one (or more) of the inventive layers of the film may have a thickness of 20 to 60.

Optional Surface Treatment Steps

The MD films, TD films, or the biaxial oriented (BO) films of the present invention are optionally subjected to one or more surface treatment steps. Surface treatment increases the surface energy of the film to render the film receptive to coatings, printing inks, and/or lamination. Preferred methods include corona discharge, flame treatment, plasma treatment, chemical treatment, or treatment by means of a polarized flame. In a preferred embodiment, one or both of the outermost surfaces of the inventive film is surface treated.

In the case of corona treatment, an advantageous procedure is to pass the film between two conductor elements serving as electrodes, such a high voltage, usually an alternating voltage (from about 5 to 20 kV and from about 5 to 30 kHz), being applied between the electrodes that spray or corono discharges can occur. The spray or corona discharge ionizes the air above the film surface, which reacts with the molecules of the film surface, causing formation of polar inclusions in the essentially non-polar polymer matrix.

For flame treatment with polarized flame, a direct electric voltage is applied between a burner (negative pole) and a chill roll. The level of the applied voltage is between 400 V and 3,000 V, preferably in the range from 500 V to 2,000 V.

Another advantage of present invention is the reduced requirement on surface treatment because of the addition of PMMA in the PE-based film. With the polar PMMA polymers added, the resultant film, either unconverted or after desired orientation process, has a higher surface energy than PE-based films otherwise without PMMA. Thus, a better treated film surface under the same surface treatment process can be achieved, or there can be a reduction or even elimination the surface treatment process while maintaining a surface having a relatively high surface energy.

Measurement of Unique Aesthetic Effects

One way of characterizing the unique aesthetic effects, even the special visual effects of silk or satin, is from the angle dependent light reflection (or "glossiness") and color luminosity (or "L"). A non-flat satin surface provides different angles to certain incident light and thus the reflected light provides different glossiness and L in different areas of the surface. This difference in glossiness and reflection can be measured by at least one of two the methods described below:

Firstly, Flop Index or "FI" is the characterization of color luminosity change, and can be mathematically calculated by the following formula:

$$\text{Flop Index} = \frac{2.69(L^*_{15°} - L^*_{110°})^{1.11}}{(L^*_{45°})^{0.86}};$$

wherein an incident light that is 45° to the surface, and the mirror reflection direction is symmetrically on the other side of the normal line which is perpendicular to the surface. $L^*_{15°}$ describes the luminosity at the angle which is 15° to the normal line from the reflection direction, and $L^*_{110°}$ is 110° to the normal line from the reflection direction. $L^*_{45°}$ is the normal line which is perpendicular to the surface. Flop Index indicates the L changes with different observation angles and higher FI means more dark and light contrast and thus more evident effect.

Secondly, Light Reflectance Index or "LRI" is the characterization of glossiness change in comparison with max reflectance. In present invention, we calculate LRI by the following formula:

$$\text{Light Reflectance Index} = \frac{\text{Max reflectance} - \text{Min reflectance}}{\text{Max reflectance}}$$

The maximum and minimum reflectance is selected from the following six angles according to the same angle definition in FI: 45 as −15°, 45 as 15°, 45 as 25°, 45 as 45°, 45 as 75°, and 45 as 110°. LRI indicates how glossiness changes with observation angles in comparison with its max glossiness. The higher LRI means more evident the effect.

Both H and LRI can be measured following ASTM E2539. Suitable measuring device include multi angle photometer MA98 from X-rite Company.

One aspect of the invention provides for a film having a FI of at least 1, preferably at least 2, more preferably at least 2.3, yet more preferably at least 2.6, yet still more preferably at least 2.7 according to ASTM E2539.

Another aspect of the invention provides for a film having a LPI of at least 0.4, preferably at least 0.5, more preferably at least 0.6, yet more preferably at least 0.7, according to ASTM E2539.

Yet another aspect of the invention provides for a film having a combination of both the aforementioned FI and LRI values.

Yet still another aspect of the invention provides for a film having a FI of at least 1, more preferably at least 2, still more preferably at least 2.6, yet still more preferably at least 2.7 according to ASTM E2539; preferably the film further having LRI of at least 0.4, preferably at least 0.5, more preferably at least 0.6, yet more preferably at least 0.7, according to ASTM E2539.

In addition to unique aesthetic and/or performance properties of the films herein, there can also be tactile benefits. For example, roughness is the character of flat surface profile affecting both visual effects and tactile effects of the subject films. Suitable methods of measuring roughness include ISO 4287:1997. Coefficient of Friction ("COF") is the character of how a film frictions to other contact surfaces under pressure. COF relates to how a film feels, especially the smoothness by touching. A suitable method of measuring COF of a film includes ISO 8295. Hardness is the character of how hard a surface is and it directly affects how a surface feels. A suitable method of measuring film hardness includes ASTM D3363-05. Of course consumer testing (qualitative or quantitative) can also be conducted to characterize these films.

EXAMPLES

A. SEM Images

Figure 1B:
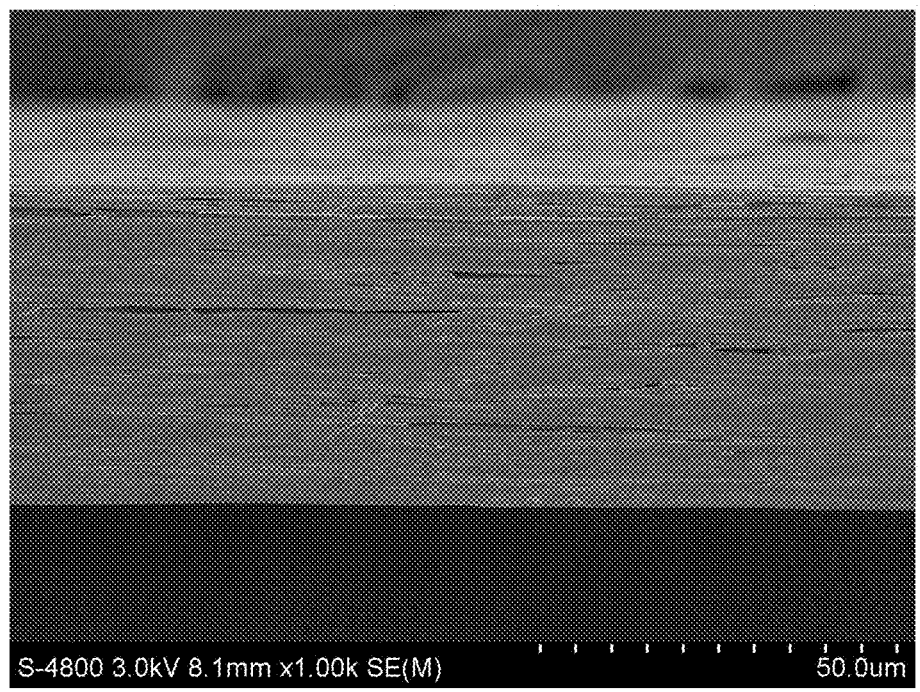
Figure 1C:
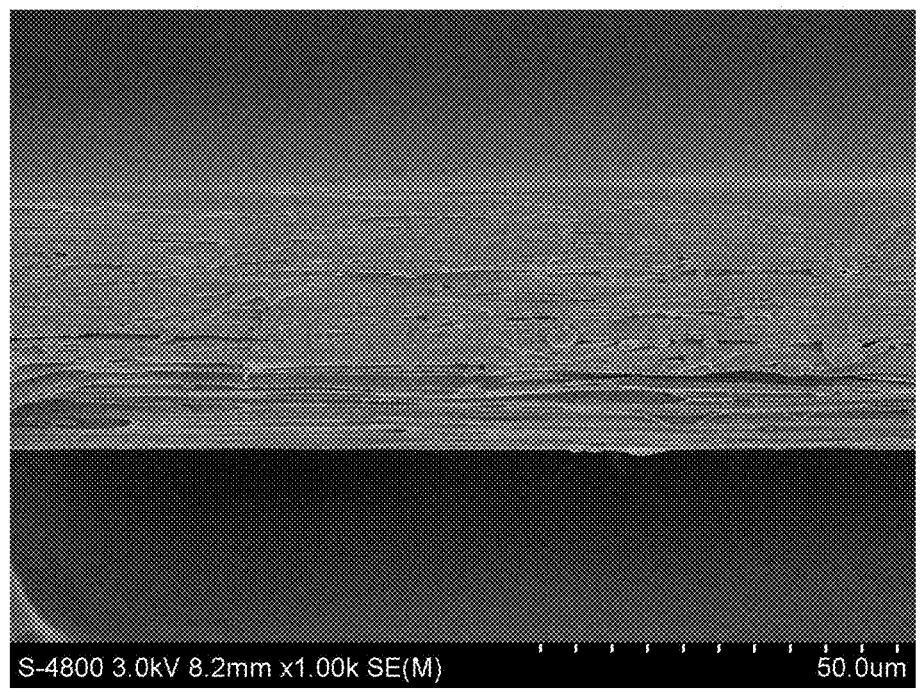
Figure 2A:
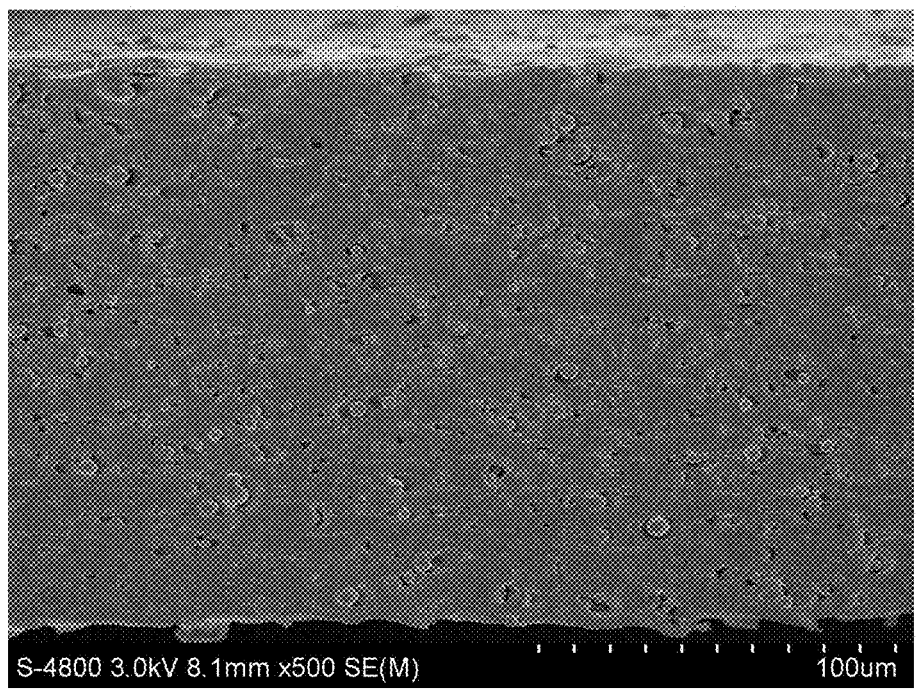
FIGS. 2A-2C are SEM images of a second film in a cross section in the machine direction.
Figure 2B:
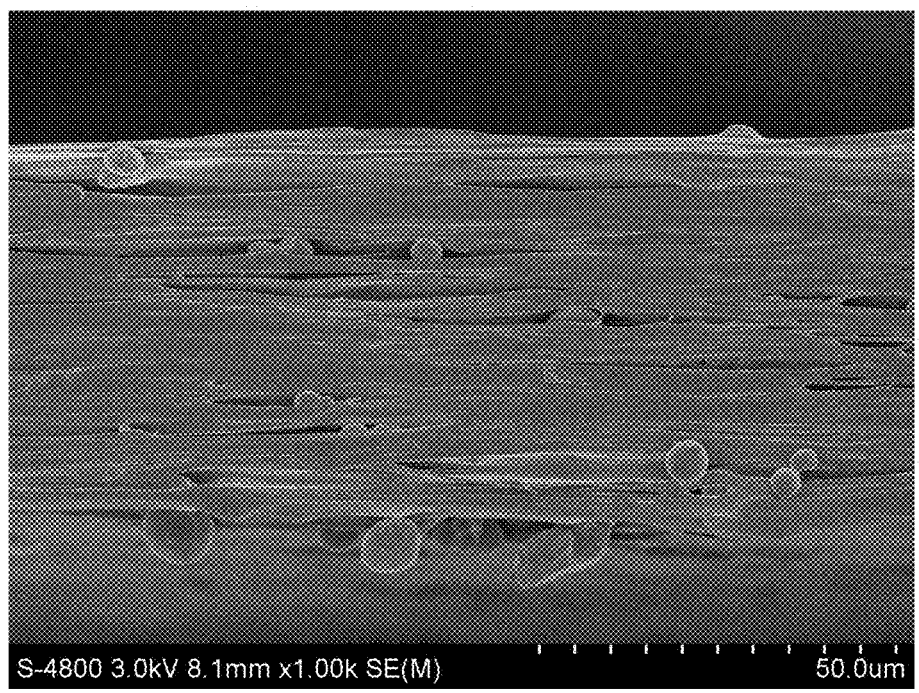
Figure 2C:
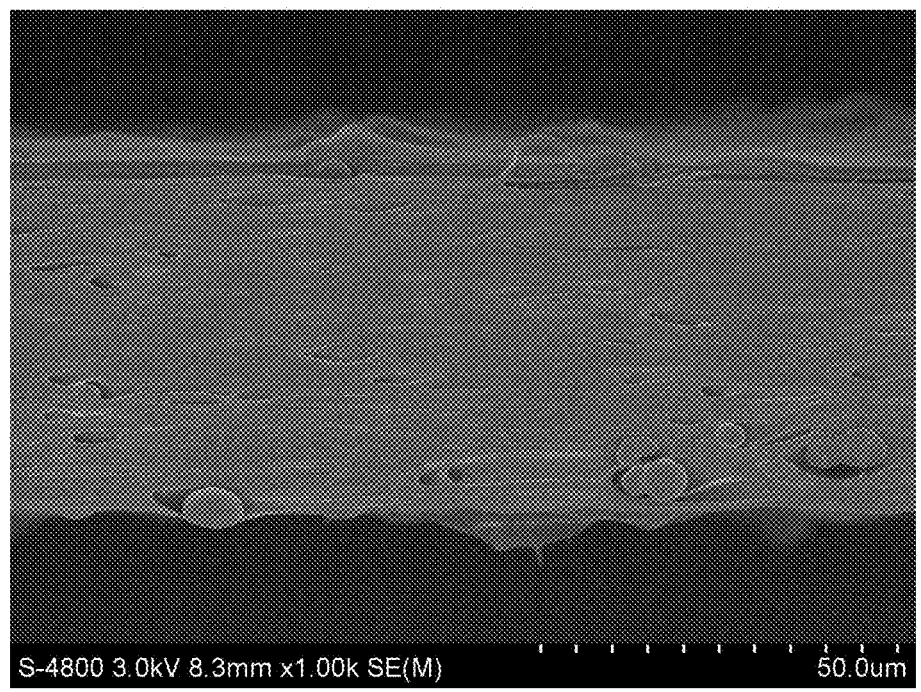

Scanning electron microscopy (SEM) images of a first film and a second film are provided. FIGS. 1A-1C are directed to a first film; while FIGS. 2A-2C are directed to a second film. The first film is preferred over the second film. Both first and second films are subjected to analogous preferred and non-preferred processing conditions. All SEM images are a cross section in the machine direction. FIGS. 1A and 2A is unconverted cast film before stretching of the respective film. FIGS. 1B and 2B is film stretched along the machine direction at below 80° C. and at 1700% stretch ratio, of the respective films. These films show good microstructure and consequently show the desired unique aesthetic effects. FIGS. 1C and 2C is film stretched along the machine direction at about 110° C. and at 1700% stretch ratio, of the respective films. These films do not show as preferred microstructure and consequently the desired unique aesthetic effects are reduced. FIG. 1B shows the preferred film morphology under the preferred processing conditions.

These images clearly show the difference in morphology of PMMA particles dispersed in PE matrix which results to different observable visual effects between the two films. In unconverted films, PMMA particles in FIG. 1A are smaller and in rod shape while in FIG. 2A the PMMA particles are larger and more bead-like. At this point in the processing, both films merely have a hazy visual effect (i.e., no unique aesthetic effects).

With MD orientation temperature under 80° C., FIG. 1B shows the smaller rod-like PMMA particle cavities having many very fine slots. FIG. 2B, shows relatively large PMMA bead-like particle cavities and consequently larger slots. Moreover, there are PMMA particles on the surface of the film in FIG. 2B, while no such PMMA particles are observed in on the film surface in FIG. 1B. Furthermore, the smaller rod-like PMMA particles provide more interface areas between PE-cavity-PMMA-cavity-PE, while the large PMMA bead-like particles provide much less of such interface areas. As a result of all above, across the same film thickness, there are much more interfaces in interact with incident light in the FIG. 1 film than in the FIG. 2 film so that the former film provides more of the desired aesthetic effects compared to the later film.

From a formulation perspective, the two films only differ in PE material, and both PE materials are both from Dow Chemical and their Dowlex™ series. A major difference lies in the viscosity of the PE (as indicated by complex viscosity). The most desirable film (i.e., having the more desired aesthetic effects) contains Dowlex™ 2045G™, while the less desired film contains Dowlex™ 2047G™ Accordingly, Dowlex™ 2047G™ is less viscous than 2045G™ and that contributes to different morphology of PMMA dispersed particles under comparable processing conditions. Therefore, the complex viscosity ratio between PMMA and PE is an important consideration in providing desired films and their unique visual aesthetics.

FIG. 3 provides complex viscosity values of several PMMA and PE materials across temperature. The complex viscosity is measured on a rotational rheometer under condition of 1 Hz oscillation with 5% constant strain and 5° C./min temperature change rate. The rotational rheometer used for this test is HAAKE MARS III from Thermo Scientific Corp. The specimen for this measurement is prepared via the method described below. Firstly, the polymer pellets are made into 1.5 mm to 2 mm thick flat sheet using a thermal pressing machine at 160° C. to 190° C. Secondly, the flat sheet is placed between the plates of the rheometer. The diameter of the plates used in this test is 20 mm Thirdly, the pressure and temperature of the plates is gradually increased until the gap between the two plates is 1 mm. All material that is squeezed out is removed before measurement.

The specific formulation of the first film (i.e., of FIG. 1) by total weight of the single layer film is: 85% Dowlex™ 2045G+10% PMMA V020 (Altuglas® from Arkema)+5% silicone oil master batch ("MB") (MB50-002 from Dow Corning containing 50 wt % polyethylene and 50 wt % vinyl terminated polydimethylsiloxane). Thereafter, 1.5 wt % of the compatibilizer maleic anhydride grafted LLDPE ("LLDPE-g-MA MD715™" from Mitsui Chemical) is added. The specific formulation of the second film (i.e., of FIG. 2) by total weight of the single layer film is: 85% Dowlex™ 2047G+10% PMMA V020 (Altuglas® from Arkema)+5% silicone oil MB (MB50-002 from Dow Corning containing 50 wt % polyethylene and 50 wt % vinyl terminated polydimethylsiloxane). Thereafter, 1.5 wt % of the compatibilizer maleic anhydride grafted LLDPE ("LLDPE-g-MA MD715™" from Mitsui Chemical) is added. Orientating temperature also plays an important role in providing the unique aesthetic effects of the films herein. At higher conventional orientation temperature such as 110° C., as in FIG. 1C and FIG. 2C, the increased mobility of PE material, as compared to lower orientating temperatures and without wishing to be bound by theory, leads to cavities merging together to form bigger cavities, and this mobile PE fills in fine cavities formed around PMMA particles. Furthermore, these high temperatures may also increase the mobility of PMMA materials to coalesce with each other to form relatively large PMMA particles. As a result, there are much larger PMMA particles in FIG. 1C and FIG. 2C in comparison to FIG. 1B and FIG. 2B respectively. This demonstrates the effect of orientating temperatures at 80° C. opposed to a conventional orientating temperature at 110° C.

B. FI and LRR Analysis

One example of unique aesthetic effect is a silk-like visual effect (i.e. essentially mimicking real silk). Indeed silk has long been regarded as a luxurious material given its unique appearance and feel. To mimic the look of silk from films, the use of pearlescent agents or pearlescent inks is typically used. Of course there are many drawbacks with this approach (as previously discussed). Furthermore, the silk-like visual effects are typically not realistic enough compared to real silk. As discussed earlier, one way of characterizing the unique aesthetic effects of the films of the present invention is by measuring FI and/or LRR per ASTM E2539. Measurements are taken of the following: (i) the films of the present invention ("Silk-like Film"); (ii) films printed with pearlescent ink ("Pearlescent Ink Film"); (iii) real silk fabric ("Real Silk"); and (iv) conventional PE film ("PE Film with $TiO_2$").

(i) The formulation of the inventive silk-film is described. Briefly, this film is a casted single layer film containing: 85% PE Dowlex™ 2045, and 10% PMMA V020™, and 5% silicone oil master batch ("SOMB") by weight of the film, (wherein the SOMB contains 50% silicone oil and 50% PE by weight of the SOMB). Thereafter, 1.5 wt % of compatibilizer LLDPE-g-MA MD715™ (Mitsui Chemical) is added during film extrusion. The unconverted film is MD oriented on a pilot scale continuous orientation machine below 90° C. as the orientation temperature and as a two step stretching process. Total stretching ratio is 8:1, with the first stretching ratio at 2:1, and second stretching ratio is at 4:1. The MD oriented film is about 60 um thick with good silk-like visual effects.

(ii) The pearlescent ink printed samples are from Toyo Ink Company as demonstrative samples of pearlescent ink effect. The ink is reversely printed on 30 microns thick conventional PE film via gravure printing process with 100% coverage of pearlescent ink in a 10 cm×21 cm area.

(iii) The Real Silk sample is a market purchased satin with 93% natural silk and 7% polyurethane fiber. The blend spinning of natural silk and polyurethane fiber is a conventional approach to make silk more durable while not reducing the visual effect.

(iv) The formulation of the silk-like film with a reduction of the desired visual effect is a casted single layer film containing: 85% PE Enable™ 2010 Exxon Mobile, and 10% PMMA V020, and 5% silicone oil master batch (SOMB) by weight of the casted film, wherein the SOMB contains 50% silicone oil and 50% PE by weight of the SOMB. In addition, 1.5 wt % of the compatibilizer LLDPE-g-MA MD715™ Mitsui Chemical is added during film extrusion. The unconverted film is MD oriented on a pilot scale continuous orientation machine under 70° C. and one step stretching with stretch ratio is 6:1. The MD oriented film is about 90 microns thick with a reduced silk-like visual effect.

(v) The conventional film is a 70 microns thick blown PE film. It is a three layer co-extruded white PE film having 20% white master batch in the core layer (i.e., middle layer) by weight of the core layer; and 8.6% white master batch in the remaining layers (i.e., in each of the top and bottoms layers, by weight of the respective layers). The master batch is 7M1508™ from Shang Hai JinZhu Master Batch Company (China). Generally the white master batch is titanium dioxide in a LDPE and/or LLDPE carrier.

Table 1 provides the FI and LRR data for the five samples:

| Sample: | Silk-like Film | Pearlescent Ink Film | Real Silk | Silk-like film with reduced effect | PE Film with TiO2 |
|---|---|---|---|---|---|
| FI | 2.92 | 2.68 | 2.61 | 1 | 0.31 |
| LRI | 0.775 | 0.709 | 0.669 | 0.449 | 0.128 |

The film with the best results (both in FI and LRI) is the silk-like film of the present invention. The worst performing film (both in FI and LRI) is the conventional PE film with titanium dioxide. The pearlescent ink film performed well, performing similar to Real Silk.

C. PMMA and PE Complex Viscosity Ratios

The complex viscosity ratio between the at least one PMMA polymer and the at least one PE polymer, and consequently the rheology there between, is an important factor in optimizing the desired unique aesthetic effects of the inventive films described herein. As previously discussed, and without wishing to be bound by theory, small rod-like morphology of the PMMA particles is desirable in providing the desired unique aesthetic effects (e.g., see FIG. 1A). These rod-like PMMA particles create more interface area in the PE matrix thereby providing more intensive interaction to light. In addition to the unique aesthetic effects (such as pearlescent, metallic-like visual effects), this desired morphology may also contribute to a film's opacity. Generally, the greater the opacity the more desirable morphology is found in the unconverted film (and in turn, more of the desired unique aesthetic effects in the final film). A suitable method of assessing opacity in a film is ISO method 6504. The relationship between different PE polymers based on complex viscosity with respect to single PMMA polymer is explored in Tables 2 below herein. The data is a single variable test where only the viscosity of the PE is varied.

Four different films are assessed for opacity. The only variable between these films is the PE polymer type and thus the complex viscosity of the PE polymer. Briefly, all film formulations contain (by weight of the single layer film): 85% of the subject PE; 10% of PMMA V020™ from Arkema; 5% silicone oil master batch (containing about 50% silicone oil and about 50% PE by weight of the SOMB). Thereafter, 1.5 wt % of compatibilizer LLDPE-g-MA MD715™ (Mitsui Chemical) is added. The films are a single layer film. The film making conditions are that the film is a casted film, and is uniaxially oriented in the machine direction in an INTRON tensile tester at a 1700% stretch ratio.

TABLE 2

Opacity and complex viscosity ratio of PMMA/PE for films based on varying the viscosity of the PE.

| PE polymer type: | PMMA polymer | Complex Viscosity ratio range under 200° C. to 230° C. PMMA/PE | Opacity |
|---|---|---|---|
| PE FB2230 ™ | V020 ™ | 0.74-1.89 | 83.5% |
| PE 2045G ™ | V020 ™ | 1.47-3.49 | 67.8% |
| PE 2047G ™ | V020 ™ | 2.75-7.08 | 53.3% |

As can be seen, the film (PE FB2230™) having the smallest complex viscosity ratio between the PMMA and PE, provides the greatest opacity. A high opacity value is an indicative of desirable aesthetic effects from the resultant film. Accordingly it is preferred to have a PE polymer having a relatively high complex viscosity blended with a PMMA polymer having a relatively low complex viscosity to reduce the complex viscosity ratio between the PMMA and PE.

D. Effect of Silicone Additives

A single variable test compares the effect of varying the amount of silicone oil in optimizing the unique aesthetic effects of the inventive films. The silicone oil is added via a master batch (MB) from Dow Corning with commercial grade name MB50-002. The master batch contains 50 wt % of silicone oil (Dow Corning) and 50 wt % of PE by weight of the master batch. All films contain the same PE polymer and PMMA polymer with different levels of silicone oil master batch. Briefly, the film formulation contains (by weight of the film) 85% PE 2045G™, 10% PMMA V020™, and 1.5% LLDPE-g-MA by weight of the film. The films are a single-layer film. The film making conditions are the film is a casted film, and is uniaxially oriented in the machine direction in an INTRON tensile tester at a 1700% stretch ratio, at an orientating temperature of about 90° C., and at a stretch rate of 1,000 mm per minute. Opacity of each film is measured (per ISO 6504) after stretching. The higher opacity generally indicates more of the desired aesthetic effects.

TABLE 3

Varying the amount of silicone to assess effect of film opacity.

| Formulation: Amount of silicone oil MB | Amount of silicone in film | Opacity: |
|---|---|---|
| 1 wt % | 0.5 wt % | 55.7% |
| 3 wt % | 1.5 wt % | 58.9% |
| 5 wt % | 2.5 wt % | 67.5% |

As the results show in Table 3, it is evident that higher loading of silicone oil results to improved effect on opacity (and thus the desired aesthetic effects).

E. Effect of PMMA Loading

The effect of PMMA loading is assessed on two film formulations. Table 4 summarizes the formulation between film samples A and B. All films are stretched at 90° C. with 1700% stretch ratio on an Instron® tensile tester. The film making conditions are the film is a casted film, and is uniaxially oriented in the machine direction in an INTRON tensile tester at a 1700% stretch ratio, at an orientating temperature of about 90° C., and at a stretch rate of 1,000 mm per minute. Opacity of each film is measured (per ISO 6504) after stretching, and the higher opacity generally indicates more the desired unique aesthetic effects.

TABLE 4

Summarized differences in blown films of film sample A and B.

| Film Sample: | Subject PE polymer type of Film Formulation: | Opacity |
|---|---|---|
| A | 90% PE2045G ™ + 5% V020 + 5% Silicone oil master batch by weight of the film; thereafter an additional 1.5 wt % LLDPE-g-MA | 20.5% |
| B | 85% PE2045G ™ + 10% V020 + 5% Silicone oil master batch by weight of the film; thereafter an additional 1.5 wt % LLDPE-g-MA | 67.5% |

As the results show in Table 4, it is evident that higher loading of PMMA results to improved effect on opacity (and thus the desired aesthetic effects).

F. Orientation Temperatures

The effect of orientating temperature is assessed for two film formulations. Table 5 summarizes the formulation and processing differences between film samples A and B. These films each contain (by weight of the film) 85% of the subject PE; 10% of PMMA V020™+3% silicone oil master batch (50 wt % of silicone oil and 50 wt % of PE); thereafter an additional 1.5 wt % of LLDPE-g-MA MD715™ is added. Regarding the subject PE films, film sample A contains PE2045G™ and film sample B contains PE FB2230™. These films are blown films with film A having a blow up ratio of 1:3 (with a thickness of 116 um), and film B having a blow up ratio of 1:2 (with a thickness of 117 um).

TABLE 5

Summarized differences in blown films of film sample A and B.

| Film Sample: | PE polymer Type | Blown film with blow up ratio: | Blown Film thickness: |
|---|---|---|---|
| A | PE 2045G ™ | 1:3 | 116 um |
| B | PE FB2230 ™ | 1:2 | 117 um |

Film samples A and B are stretched on an INSTRON tensile tester equipped with a temperature chamber. The film is cut into a 70 mm wide specimen and tensile clamp gap is set as 10 mm Upon the specimen becoming stabilized under the subject MD orientating temperature, the upper clamp moves upward at a speed of 1000 mm/min to stretch the film. The stretch ratio is fixed at 1700% for all specimens. The subject MD orientating temperatures in this study include: 22° C. (i.e., room temperature), 60° C., 70° C., 80° C., and 100° C. Opacity of each film is assessed per ISO 6504. Table 6 below provides the opacity values for films samples A and B under the range of MD orientating temperatures.

TABLE 6

Opacity of Films A and B at various MD orientating temperatures is provided.

| | | Film Sample A | Film Sample B |
|---|---|---|---|
| Opacity at MD Orientating Temperatures: | 100° C. | 40.53 | 36.52 |
| | 80° C. | 56.77 | 56.44 |
| | 70° C. | 62.10 | 60.01 |
| | 60° C. | 72.07 | 68.62 |
| | 22° C. | 81.49 | 84.81 |

It is determined that for both film samples A and B, the higher the orientating temperature, the lower the opacity of the resultant film. Thus to achieve more of the desired unique aesthetic effects, a relatively lower orientating temperature is preferred.

G. Co-extrusion Film

Films of the present invention may have at least one or more of the inventive film layers. These inventive film layer(s) may be on the outermost surface of the film or may be a middle or core layer (i.e., in between outer film layers).

Flop Index (FI) values of a single-layer film of the present invention is compared to a multi-layer co-extrusion film of the present invention. Film A is a single layer film comprising: 85% Dowlex™ 2045+10% of PMMA V020™ from Arkema+5% silicone oil master batch (50 wt % of silicone oil and 50 wt % of PE), by weight of the film layer (i.e., film), thereafter an additional 1.5 wt % of LLDPE-g-MA MD715™ is added to the film layer (i.e., film). Film sample B is a three layer co-extrusion film where the outermost layers are both 100% PE, specifically Dowlex™ 2045, by weight of the respective outer layer; wherein the middle layer (i.e., core layer) of the film comprises: 85% Dowlex™ 2045+10% of PMMA V020™ from Arkema+5% silicone oil master batch (50 wt % of silicone oil and 50 wt % of PE), by weight of the middle layer, thereafter an additional 1.5 wt % of LLDPE-g-MA MD715™ is added to this middle layer. The thickness distribution of the Film B is generally 1:2:1 as it relates to the first outermost layer:middle layer:second outermost layer, respectively. For avoidance of doubt, the formulation of Film A is the same as the formulation as the middle layer of Film B. Each of the Film Samples is made into unconverted film as described in Table 7. Thereafter, both films are uniaxially oriented in the machine direction by an INTRON tensile tester at 1700% stretch ratio, at an orientating temperature of about 70° C., and at a stretch rate of 1,000 mm per minute.

TABLE 7

FI values of Film Samples A (single layer) and B (three layer) and unconverted film making processing are provided.

| Film Sample | Film Layer(s) | Unconverted Film Making Process | FI |
|---|---|---|---|
| A | Single Layer Film | 170 um thick single layer blown film with blow up ratio around 1:3 | Ave. 3.12 (2.53, 2.69, 4.14) |
| B | Three layer co-extrusion film | 170 um thick co-extrusion blown film with blown up ratio around 1:3 | Ave. 2.94 (2.6, 3.04, 3.19) |

As shown in Table 7, a three layer co-extrusion film with PMMA and Silicone oil only the in core layer (Sample B) has a slight reduction in desired unique aesthetic effects compared to the single layer film containing the same level of PMMA and Silicone oil (Sample B) as evidenced by the average FI values. Thus multi-layer co-extrusion film can also provide quite good results of the desired aesthetic effects in between PE film layers that are otherwise free of PMMA and silicone oil.

H. Effect of Titanium Dioxide for Enhanced Opacity

The effect of adding titanium dioxide (TiO$_2$) in addition to PMMA and silicone oil for enhance opacity is assessed in three film formulations. The TiO$_2$ is added via master batch from Ampacet Corp.'s 11748-K Lamite 48™ with 70 wt % TiO$_2$ loading in the master batch. Table 9 summarizes the formulations, specific TiO$_2$ loading in each film, specific thickness of the film, and opacity of each film. As shown, for inventive film number B, only small quantity of TiO$_2$ in the formulation yields significantly enhanced opacity. While for traditional blown film of film number C, to achieve similar opacity, it requires nearly double the use of TiO$_2$ together with almost double of the film thickness. Film number A is a control. Opacity is measured by per ISO 6504.

Table 8 summarizes film formulation IbrTiO: addition and resulting opacity.

| Film No. | Film Formulation | Film Making Process | TiO$_2$ (wt %) | Final film thickness | Opacity |
|---|---|---|---|---|---|
| A Single layer film without TiO$_2$ | 85% PE2045G ™ + 10% V020 ™ + 5% Silicone oil master batch by weight of the film; thereafter an additional 1.5 wt % LLDPE-g-MA | Unconverted film: 165 um blown film MDO: stretch ratio 1:6 under 80° C. | 0 | 50 um | 62.5% |
| B Symmetrical co-extrusion film with TiO$_2$ only in core layer (layer B) | A-B-A symmetrical structure A = identical formulation of film 1 B = 78% PE 2045 ™ + 10% V020 ™ + 5% Silicone oil master batch + 7% Ampacet Corp.'s 11748-K Lamite 48 ™; Layer thickness distribution A:B:A = 1:2:1, respectively | Unconverted film: 165 um blown film MDO: stretch ratio 1:6 under 80° C. | 2.5% | 45 um | 78.5% |
| C Conventional co-extrusion blown film with TiO$_2$ in all layers | A-B-A symmetrical structure; wherein A = 72.6% LLDPE + 20% LDPE + 7.4% Lamite 48; B = 20% LLDPE + 72.6% MDPE + 7.4% Lamite 48; Layer thickness distribution A:B:A = 3:4:3, respectively | Blown film | 5.18% | 70 um | 74.5% |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A film comprising having at least one layer, wherein the at least one layer comprises:
    a) a polyethylene (PE) component comprising at least one PE polymer, wherein the PE component comprises 70% to 99%, by weight of the at least one layer;
    b) a poly(methyl 2-methylpropenoate) (PMMA) component comprising at least one PMMA polymer, wherein the PMMA component comprises 1% to 30%, by weight of the at least one layer;
    c) 0% to 15%, by weight of the at least one layer, of an optional ingredient; and
    wherein the at least one PMMA polymer and the least one PE polymer have a complex viscosity ratio below 4, and wherein complex viscosity is measured via a rotational rheometer from a temperature of 200° C. to 240° C. at 5° C./min heating speed, 1Hz frequency, and constant 5% strain, according to ASTM D4440-15.

2. The film of claim 1, wherein the complex viscosity ratio between the PMMA polymer and the PE polymer is below 3.

3. The film of claim 1, wherein the PMMA component and the PE component have a complex viscosity ratio range below 4, wherein the complex viscosity is measured via a rotational rheometer from a temperature of 200° C. to 240° C. at 5° C./min heating speed, 1Hz frequency, and constant 5% strain, according to ASTM D4440-15.

4. The film of claim 1, wherein the complex viscosity ratio between the at least one PMMA polymer and the at least one PE polymer is from 0.5 to 1.5, wherein the complex viscosity is measured via a rotational rheometer, from a temperature of 200° C. to 240° C., at 5° C./min heating speed, at 100 Hz frequency, and a constant 5% strain, according to ASTM D4440-15.

5. The film according to claim 1, wherein:
    (a) the at least one PMMA polymer has a complex viscosity from 150 Pascal-second (Pa*s) to 800 Pa*s, wherein the complex viscosity is measured via a rotational rheometer, from a temperature of 200° C. to 240° C., at 5° C./min heating speed, at 100 Hz frequency, and a constant 5% strain, according to ASTM D4440-15; and
    (b) the at least one PE polymer has a complex viscosity of 250 Pascal-second (Pa*s) to 600Pa*S, wherein the complex viscosity is measured via a rotational rheometer, from a temperature of 200° C. to 240° C., at 520 C./min heating speed, at 100 Hz frequency, and a constant 5% strain, according to ASTM D4440-15.

6. A film comprising at least one layer, wherein the at least one layer comprises:
    a) a polyethylene (PE) component comprising at least one PE polymer, wherein the PE component comprises 70% to 99%, by weight of the at least one layer;
    b) a poly(methyl 2-methylpropenoate) (PMMA) component comprising at least one PMMA polymer, wherein the PMMA component comprises 1% to 30%, by weight of the at least one layer;
        wherein the at least one PMMA polymer has a melt index from 1 gram (g)/10 minutes (min) to 16 g/10 min measured at 230° C. and 3.8 Kg according to ASTM D1238;

wherein the at least one PE polymer has a melt index from 0.1 gram (g) /10 minutes (min) to 40 g/ 10 min measured at 190° C. and 2.16 Kg according to ASTM D1238;
wherein the melt index ratio between the least one PMMA polymer and the least one PE polymer is greater than 0.7; and
c) 0% to 15%, by weight of the at least one layer, of an optional ingredient.

7. The film according to claim 6, wherein melt index ratio between the least one PMMA polymer and the least one PE polymer is from 0.7 to 70.

8. The film according to claim 1, wherein the film having a Flop Index (FI) of at least 1, according to ASTM E2539.

9. The film according to claim 8, wherein film having Light Reflectance Index (LRI) of at least 0.4, according to ASTM E2539.

10. The film according to claim 7, wherein the film having a Flop Index (FI) of at least 2, according to ASTM E2539; and a Light Reflectance Index (LRI) of at least 0.5, according to ASTM E2539.

11. The film according to claim 1, wherein the at least one PMMA polymer has a Vicat softening point below 115° C. at 1 kg and rate A according to ASTM D1525.

12. The film according to claim 1, wherein the PE component comprises 70% to 98%, by weight of the at least one layer; and the PMMA component comprises 2% to 25%, by weight of the at least one layer.

13. The film according to claim 1, wherein the PE polymer comprises a linear low density polyethylene (LLDPE), and wherein the LLDPE comprises from 30% to 100%, by weight of the PE component.

14. The film according to claim 1 further comprising from 0.01% to 10%, by weight of the at least one layer of the film, of a silicone additive; wherein the silicone additive has a viscosity from 1,000 cSt to 40,000,000 cSt.

15. The film according to claim 1, further comprising 0.5% to 8%, by weight of the at least one layer, of a silicone additive, wherein the silicone additive has a molecular weight from 400,000 Daltons to 700,000 Daltons.

16. The film according to claim 1, further comprising 0.01% to 5%, by weight of the least one layer of the film, of a compatibilizer.

17. The film according to claim 16, wherein the compatibilizer is a maleic anhydride grafted linear low density polyethylene.

18. The film according to claim 1, having an opacity of greater than 55%, when measured at 50 microns thickness per ISO 6504.

19. A flexible film comprising having at least one layer, wherein the at least one layer comprises:
a) a polyethylene (PE) component comprising at least a linear low-density polyethylene (LLDPE) polymer, wherein the PE component comprises 70% to 98%, by weight of the at least one layer;
b) a poly(methyl 2-methylpropenoate) (PMMA) component comprising at least one PMMA polymer, wherein the PMMA component comprises 1% to 30%, by weight of the at least one layer;
c) 1% to 10%, by weight of the at least one layer, of a silicone additive, wherein the silicone additive has a viscosity greater than 1,000 cSt per ASTM D-4287; and wherein the film has: a Flop Index (FI) of at least 1 according to ASTM E2539; and a Light Reflectance Index (LRI) of at least 0.4 according to ASTM E2539.

20. The film of claim 19, having an opacity of greater than 60%, when measured at 50 microns thickness per ISO 6504; and wherein film contains from 0% to less than 5%, by weight of the at least one layer, of titanium dioxide.

* * * * *